No. 863,738. PATENTED AUG. 20, 1907.
F. J. MASHAW.
TOASTER OR BROILER.
APPLICATION FILED FEB. 19, 1907.

2 SHEETS—SHEET 1.

Witnesses

Inventor
Frederick J. Mashaw
By Henry N. Copp
His Attorney

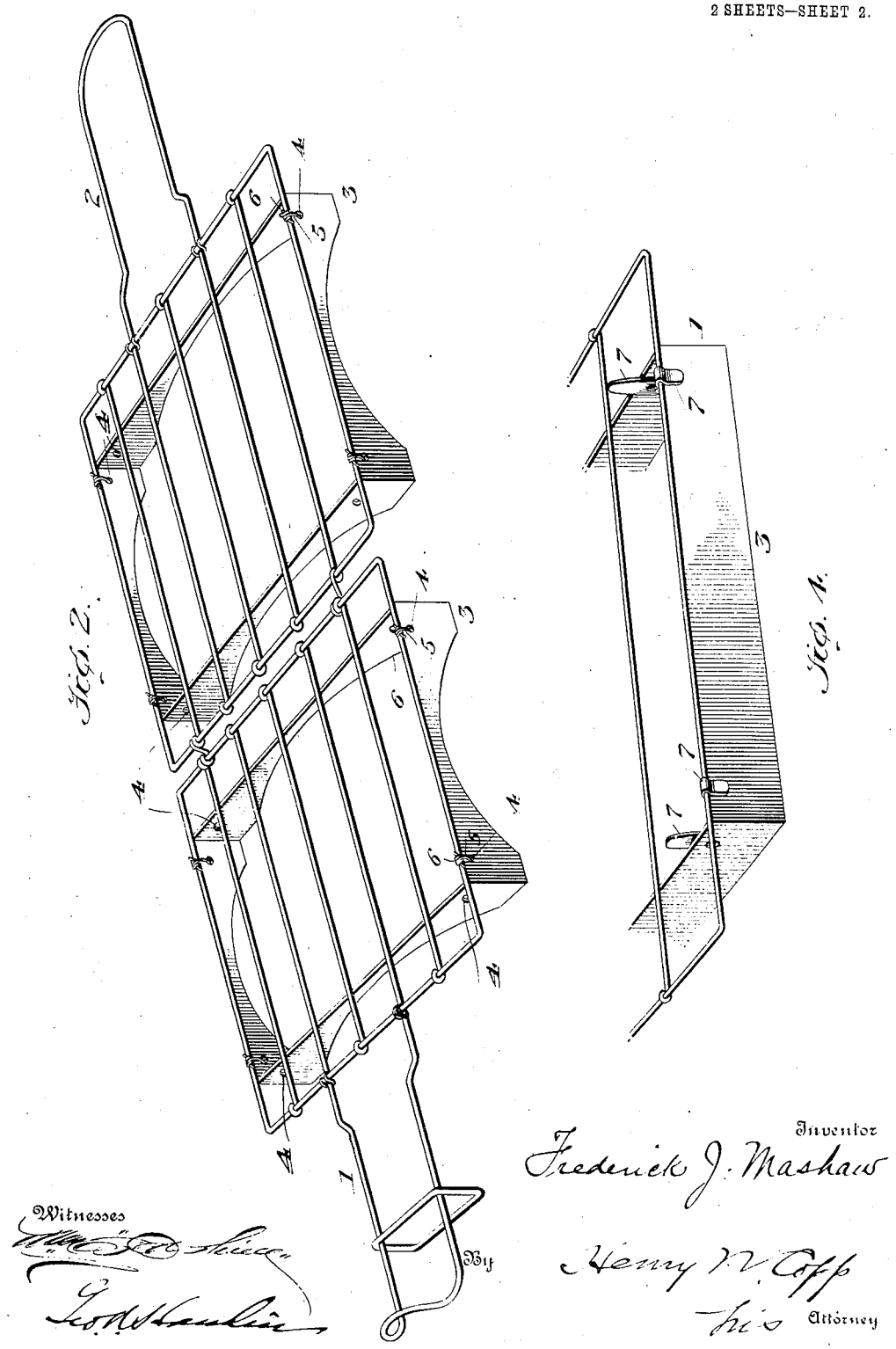

UNITED STATES PATENT OFFICE.

FREDERICK J. MASHAW, OF BILLINGS, MONTANA.

TOASTER OR BROILER.

No. 863,738.

Specification of Letters Patent.

Patented Aug. 20, 1907.

Application filed February 19, 1907. Serial No. 358,286.

*To all whom it may concern:*

Be it known that I, FREDERICK J. MASHAW, a citizen of the United States, residing at Billings, county of Yellowstone, and State of Montana, have invented certain new and useful Improvements in Toasters or Broilers, of which the following is a specification.

This invention relates to toasters or broilers.

The object of the present invention is the provision of a double frame toaster or broiler of improved and novel construction having supplemental supports connected to the outer faces of the respective broiler or toaster frames which hold the toaster or broiler raised from the surface of the range and allow the bread to toast, or the meat to broil, more evenly, prevent the bread or meat from coming in contact with the range, thus obviating scorching or blackening, insure proper toasting or broiling effects in a minimum time without danger of damage to the meat or bread, and at the same time obviate the necessity of opening the double frames and reversing the bread or meat therebetween when one side has been toasted or broiled and the other side is to be submitted to the heat.

Another object of the invention is the provision of a novel frame adapted for separate use or for attachment to an ordinary toaster or broiler to support the toaster or broiler in a raised arrangement so that contact of the bread or meat with the range is prevented; the invention also contemplates the provision of improved means for fastening the device to an ordinary toaster or broiler.

The invention is set forth fully hereinafter and the novel features are recited in the appended claims.

Figure 1:
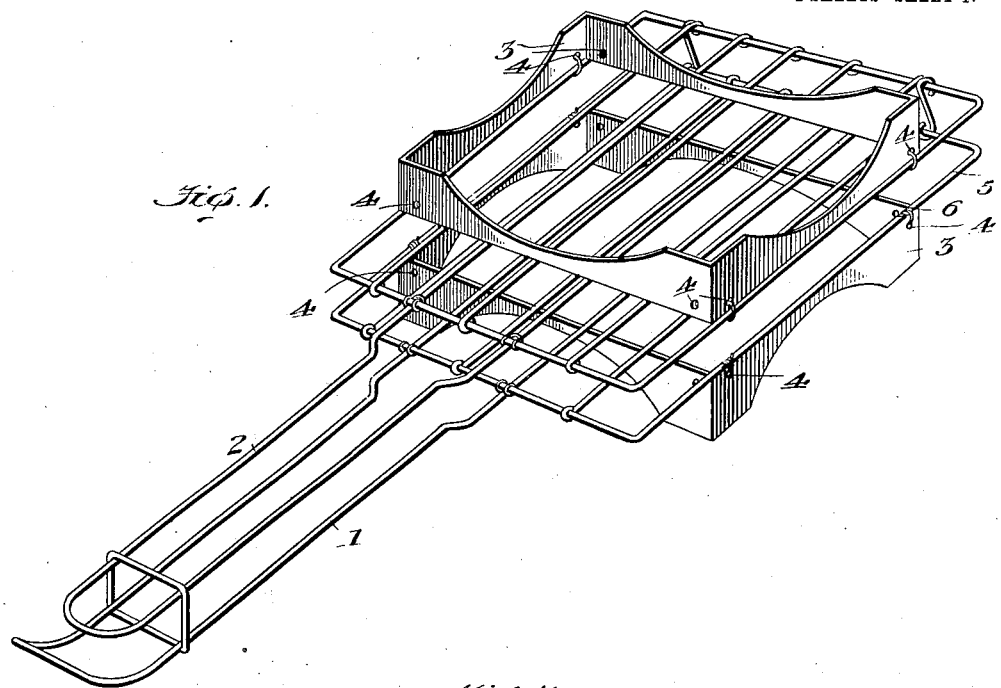
Figure 3:
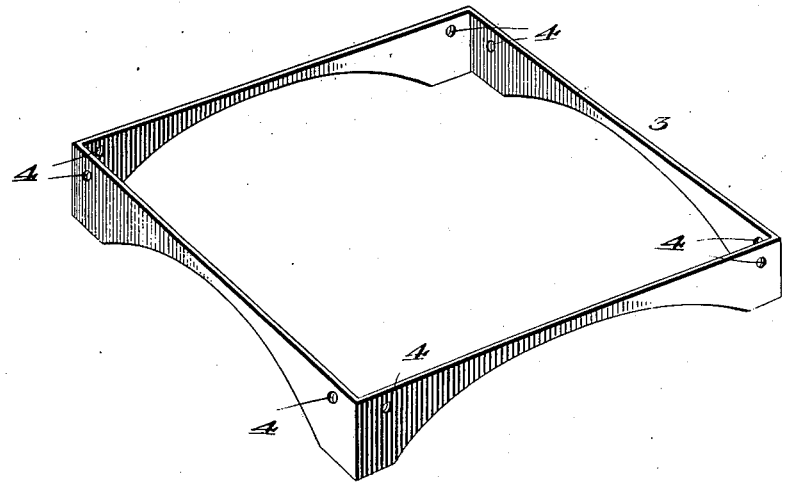

In the accompanying drawings:—Figure 1 is a perspective view of the invention applied to an ordinary toaster or broiler; Fig. 2, a view showing the toaster or broiler, equipped with the invention, opened out; Fig. 3, a detail view of the attachment by itself; and Fig. 4, a view showing a modified form of the invention.

The numerals 1 and 2 represent the parts of an ordinary double frame wire broiler or toaster.

I propose to apply my invention to either of the parts 1 or 2, or to both of them, the latter being preferable as the toaster or broiler can then be laid down on the range without reference to which side is uppermost and it permits reversal without removing the bread or meat from between the frames.

The numeral 3 represents my improved attachment which is preferably made from a single band of metal of square shape, having two holes 4 in each side, through any of which the wires 5 may be passed and bent around the wires of the parts 1 and 2 and twisted together, as shown at 6.

In the modification shown in Fig. 4, hooks or lugs 7, which are integral with the frame 3, are employed, the same being adapted to be twisted around the wires of the parts 1 and 2 of the toaster or broiler.

In using the invention, the frame 3 may be used by itself and the meat or bread simply rested thereupon, the frame setting on the range.

When the invention is used in connection with an ordinary toaster or broiler, as shown at 1 and 2, the frames 3 are attached to the parts 1 and 2 and afford a support for holding the broiler or toaster itself raised from the range or stove, in which case the bread or meat is laid between the parts 1 and 2.

As shown in Fig. 2, the broiler or toaster may be opened out to accommodate double the quantity of meat or bread, the latter being reversed by using a fork or other utensil when desired.

Having thus described my invention, what I claim as new and desire to secure by Letters Patent, is:—

1. A toaster or broiler comprising a pair of frames movably connected together, and independent supplemental supports respectively attached to the outer faces of the frames aforesaid and projecting therefrom in superposed relation thereto, thereby making provision for support of the toaster or broiler from either side thereof or for supporting both frames in extended relation to each other.

2. A broiler or toaster comprising a pair of frames movably connected together and having matching handles, and independent open band-like frames respectively attached to the outer faces of the frames aforesaid and projecting therefrom in superposed relation thereto, thereby making provision for support of the toaster or broiler from either side thereof or for supporting both frames in extended relation to each other.

In testimony whereof, I hereunto affix my signature in presence of two witnesses.

FREDERICK J. MASHAW.

Witnesses:
FRED INABNIT,
LIZZIE TREPP.